Dec. 15, 1925.
G. R. ALEXANDER
WATER SUPPLY SYSTEM
Filed Dec. 10, 1923
1,565,769
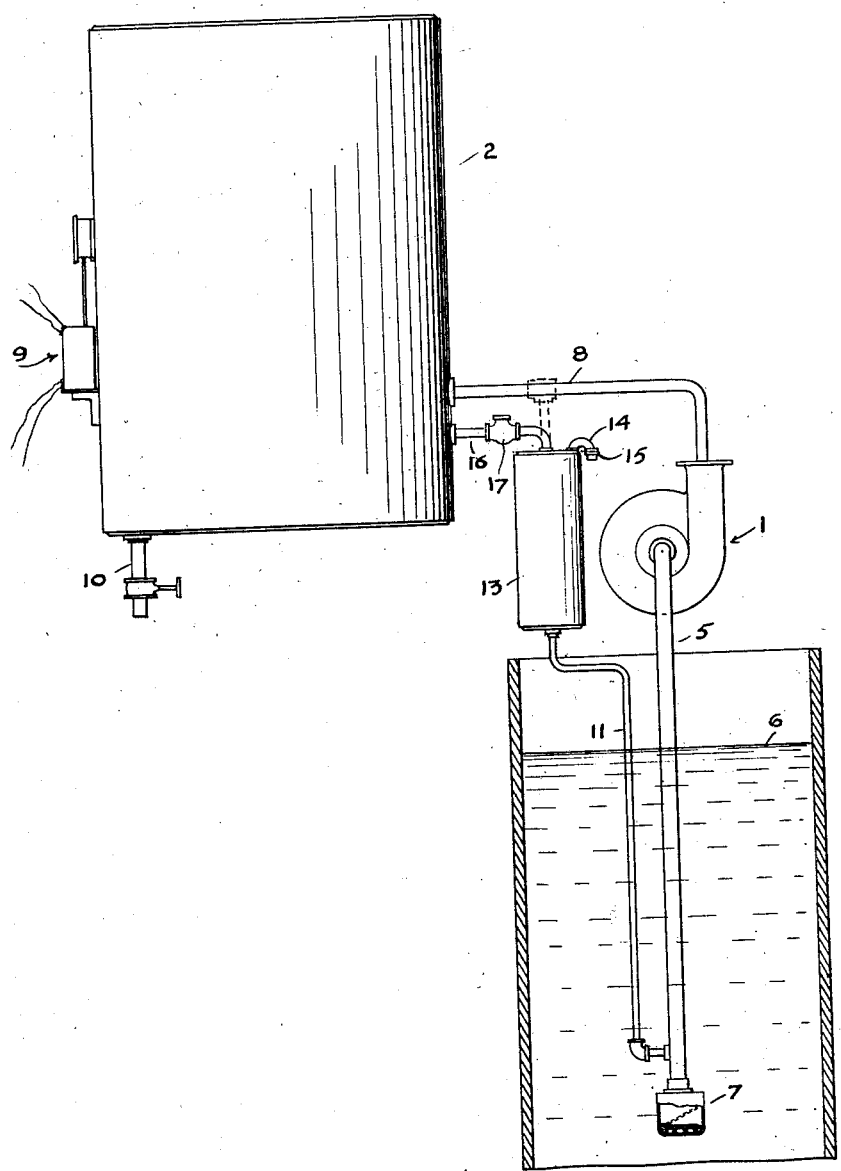
INVENTOR
G. R. ALEXANDER
BY *Wright & Chunn*
ATT'YS.

Patented Dec. 15, 1925.

1,565,769

UNITED STATES PATENT OFFICE.

GEORGE R. ALEXANDER, OF OAKLAND, CALIFORNIA.

WATER-SUPPLY SYSTEM.

Application filed December 10, 1923. Serial No. 679,649.

*To all whom it may concern:*

Be it known that I, GEORGE R. ALEXANDER, a citizen of the United States, residing at Oakland, in the county of Alameda and State of California, have invented new and useful Improvements in Water-Supply Systems, of which the following is a specification.

This invention relates to improvements in apparatus for distributing water and resides in the provision of simple and reliable apparatus for pumping water from a source of supply into a storage tank and for causing the discharge of water from said tank by air pressure.

The invention deals mainly with an improved means for maintaining an adequate supply of water and compressed air within the storage tank and consists in an arrangement providing for the use of water which has been drawn into the suction pipe of the pump from a source of supply, as a medium for maintaining the adequate supply of compressed air and water in the tank, which arrangement is inexpensive and does not comprise a multiplicity of valves, motors, pumps, or elements besides those such as usually required to pump water from a source of supply into a tank.

The invention further consists in the provision of water distribution apparatus of the character described which may be installed and operated at a low cost.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawing:

The figure represents a semi-diagrammatic view of the apparatus of my invention showing the system applied to a well or cistern.

The herein disclosed embodiment of the invention includes a pump 1 and storage tank 2. The pump is adapted to be connected with a suction pipe 5 which may be extended into a source of water supply shown at 6, in Fig. 1, and has the usual foot valve 7 on its lower end. Water is forced by the pump through a pipe 8 into the tank 2.

An automatic pump controlling mechanism generally designated 9 is mounted on the tank and comprises essentially a circuit closer for an electric circuit for said motor, which circuit closer is operated by pressure in the tank so that the circuit is closed and the pump operated when the tank pressure lowers to a predetermined point, and is opened, causing the pump to cease its operation, when the pressure rides to a predetermined point. These variations in the tank pressure are caused by varying the level of the water contained in said tank, also by absorption and leakage of the air. A water distribution pipe 10 is connected with the tank.

A pipe communication is established between the storage tank and the suction side of the pump, the point of communication being below the level of the water in the source of supply, as for example, near but above the foot valve. In this pipe communication provision is made for the intaking of air from the atmosphere when water in said pipe descends to the level of the water in the source of supply, which descent takes places on operation of the pump. A check valve provided at the air intaking point prevents the discharge of air or water from the pipe and another check valve provided above the air intaking point, permits air and water to enter the tank but prevents water from flowing back past the valve.

As illustrated in the embodiment of the invention shown in the accompanying drawing, I may connect a pipe 11 with the suction pipe at a point above said foot valve and extend said pipe upwardly to a small air compressing chamber 13. At the upper end of this chamber is an air intake 14 having an inwardly opening check valve 15. Extending from the upper end of the chamber 13 is a pipe 16 communicating with the tank 2, or this pipe may be connected with the pipe 8 as shown in dotted lines. In this pipe 16 is a suitable check valve 17 which opens in the direction of the flow of water into the storage tank but closes and prevents back flow of water from the tank. Although I have shown the chamber 13 I wish it understood that this may be dispensed with and an ordinary pipe line used instead, said pipe line having an air intake and check valve arrangement, however, as provided in the arrangement shown in the drawing.

When the suction pipe and pipe 11 are lowered into the supply of water, the foot valve opens and water rises in both pipes to the level of the water in the source of supply. The storage tank is empty at this time except for air contained therein and on starting the pump, water is forced into the tank causing the air therein to be compressed. When the pump is started water standing in the pipe 11 will not be drawn out of said pipe inasmuch as this column of water will at all times remain at a height corresponding to the level of the water in the source of supply. When the pressure of air in the storage tank reaches a predetermined point, this being before the tank is filled, the mechanism 9, as is commonly employed in water distribution systems and need not be described in detail, automatically opens the circuit of the motor and stops the pump. When the pump stops the pressure of the water in the suction pipe and tank closes the foot valve and the water rises in the pipe 11 forcing air in said pipe upwardly into the chamber 13. Inasmuch as the check valve 17 is held closed by the hydropneumatic pressure of fluids in the storage tank the air in the pipe 11 and cylinder 13 reaches a pressure greater than that holding the check valve closed before the valve will open and permit entrance of the air into the storage tank. In this way the air in the pipe 11 and cylinder 13 is compressed before being discharged into the storage tank. Air thus forced into the storage tank bubbles up through the water and accumulates with the hitherto compressed air, above the level of the water in the said tank. When the air has been forced through the check valve 17, said valve closes by gravity. When the pressure in the tank is reduced to a pretermined low point, this reduction in pressure taking place when water is drawn from the tank or when air is absorbed by the water or leakage thereof takes place, the mechanism 9 will operate to close the circuit of the motor and the pump operation commences. As soon as the pump starts the water standing in the cylinder 12 and pipe 11 is drawn out by the suction of the pump until it reaches the level of the water in the source of supply. From then on the suction action in the pipe 11 is negative and the water is taken in solely through the foot valve. This leaves a column of water standing in the pipe 11 which serves as a seal to prevent air being drawn in through the air intake 14 and into the pump. When the water lowers in the cylinder 13 and pipe 11, the check valve 15 in the air intake 14 opens and air is drawn into the cylinder 13 and pipe 11. When the pressure of the air in the tank again reaches a predetermined point, due to the rising of the level of the water in the tank, the mechanism 9 again operates to open the circuit of the motor and stop the pump. The water again rises in the pipe 11 compressing the air in said pipe and chamber as previously described, causing said compressed air to be discharged into the storage tank. In this way the air supply is replenished and provision made for maintaining an adequate supply of air in the storage tank to insure distribution by air pressure at all times. It will thus be seen that the invention takes into consideration the replenishing of the supply of compressed air each time that the pump is stopped following its operation to supply water to the storage tank. Although pressure of air in the storage tank has reached a point quite sufficient for causing water to be discharged from said tank when the pump is stopped, a further charge of compressed air is introduced to make up for losses due to leakage or absorption or other causes and to maintain an adequate working volume of air within the storage tank.

One of the most important features of the invention is that the necessary volume of air is maintained in the storage tank through the employment of a very simple, inexpensive arrangement taking into consideration but a single pipe line, small compressing cylinder and two check valves. It is obvious that the single line connected with a water supply pipe 8, or with the storage tank itself, and connected with the suction pipe at a point below the level of the water in the source of supply, together with an air intake in said pipe line, a check valve for said intake and another check valve corresponding to the one 17, may be used without requiring a compression chamber such as the one 13.

I claim:

1. A liquid supply system embodying in its construction a storage tank, a pump for delivering liquid to said tank from a source of supply, a suction pipe for said pump, a foot valve on said suction pipe and means actuated by pressure from the storage tank for forcing air into said tank.

2. A water supply system embodying in its construction a storage tank in which air contained therein is compressed on the rising of the water in the tank, a pump for delivering water to said tank from a source of supply, a suction pipe for the pump, a foot valve on the suction pipe and means actuated by pressure from the storage tank for forcing atmospheric air into said tank, in which means water taken in through the foot valve serves as a medium for forcing air into the tank.

3. A water supply system embodying in its construction a storage tank, a pump for delivering water from a source of supply to said tank, a suction pipe for the pump adapted to extend into the source of water supply, a pipe communication between a point on the suction pipe, which point is below the level of the liquid in the source of supply, and said storage tank, an atmospheric air intake associated with said pipe communication, an inwardly opening check valve in said pipe, and a check valve in said pipe communication between the storage tank and said intake.

4. A water supply system embodying in its construction a storage tank, a pump for delivering water from a source of supply to said tank, a suction pipe for the pump extending into the source of supply, a foot valve in the suction pipe, a pipe line connected at one end with the suction pipe at a point below the level of the water in the source of supply and above the foot valve and extending upwardly with its other end arranged to discharge into said storage tank, an inwardly opening check valve providing for intaking of atmospheric air into said pipe line and a check valve in the pipe line between the storage tank and said inwardly opening check valve.

5. A water supply system embodying in its construction a storage tank, a pump for delivering water from a source of supply to said tank, a suction pipe for said pump extending into the source of supply, a foot valve on the suction pipe and means acting when the pump is stopped to introduce compressed air into said storage tank, which means includes means of communication between the suction side of the pump and said tank, said means having an atmospheric air intake, an inwardly opening check valve for said intake and a check valve in said means of communication opening in the direction of the flow of air into the tank and closing in the opposite direction.

6. A water supply system embodying in its construction a storage tank, a pump for delivering water from a source of supply to said tank, a suction pipe for said pump extending into the source of supply, a foot valve on the suction pipe and means acting when the pump is stopped to introduce compressed air into said storage tank, which means includes means of communication between the suction side of the pump and said tank, said means having an atmospheric air intake, an inwardly opening check valve for said intake and a check valve in said means of communication opening in the direction of the flow of air into the tank and closing in the opposite direction, said means of communication being connected with said suction pipe at a point below the level of the water in the source of supply and above said foot valve.

7. A water supply system embodying in its construction a storage tank, a pump for delivering water from a source of supply to said tank, a suction pipe extending from the pump into the source of water supply, a foot valve on the suction pipe, a pipe connected with the suction pipe at a point below the level of the water in the source of supply and above the foot valve, a compression cylinder with which the last named pipe is connected, which compression cylinder is provided with an atmospheric air intake opening, an inwardly opening check valve controlling said opening, a pipe leading from said compression cylinder and arranged to discharge into the storage tank and a check valve in said last named pipe opening in the direction of discharge into the storage tank and closing in the opposite direction.

8. A water supply system embodying in its construction a storage tank, a pump for forcing water into the storage tank from a source of supply, a pipe connecting the pump and storage tank, a suction pipe for the pump adapted to extend into the source of supply, a foot valve on the suction pipe, a motor for operating the pump, means associated with the tank and motor acting automatically to start the motor when pressure in the tank drops to a predetermined point and to stop the motor when the pressure in the tank rises to a predetermined point and means acting when the motor and pump are stopped to introduce compressed air into the storage tank, which means includes a pipe line connected with a suction pipe at a point below the level of the water in the source of supply and above the foot valve and arranged to discharge into the storage tank, said pipe line having an atmospheric air intake opening, an inwardly opening check valve for said opening and another check valve between the air intake opening and storage tank.

GEORGE R. ALEXANDER.